US012625941B1

(12) United States Patent
Poghosyan et al.

(10) Patent No.: US 12,625,941 B1
(45) Date of Patent: May 12, 2026

(54) INVALIDATING AWS TEMPORARY ROLE ASSUMPTION ACCESS CREDENTIALS USING SESSION POLICIES AND SESSION TAGS

(71) Applicants: Artyom Poghosyan, Glendale, CA (US); Sameer Hiremath, Glendale, CA (US)

(72) Inventors: Artyom Poghosyan, Glendale, CA (US); Sameer Hiremath, Glendale, CA (US)

( * ) Notice: Subject to any disclaimer, the term of this patent is extended or adjusted under 35 U.S.C. 154(b) by 133 days.

(21) Appl. No.: 18/646,386

(22) Filed: Apr. 25, 2024

Related U.S. Application Data

(60) Provisional application No. 63/461,793, filed on Apr. 25, 2023.

(51) Int. Cl.
 G06F 21/42 (2013.01)
 G06F 3/00 (2006.01)
 (Continued)

(52) U.S. Cl.
 CPC .............. G06F 21/42 (2013.01); G06F 3/06 (2013.01); G06F 3/0604 (2013.01);
 (Continued)

(58) Field of Classification Search
 CPC ........ G06F 3/06; G06F 3/0604; G06F 3/0655; G06F 3/0673; G06F 21/42; G06F 21/62; H04L 9/3228; H04L 67/306
 See application file for complete search history.

(56) References Cited

U.S. PATENT DOCUMENTS

| | | | | |
|---|---|---|---|---|
| 8,874,914 B2 * | 10/2014 | Stauth | .................... | G06F 21/45 |
| | | | | 713/170 |
| 11,757,886 B2 * | 9/2023 | Cook | .................... | H04L 63/20 |
| | | | | 726/4 |

(Continued)

OTHER PUBLICATIONS

"IAM Roles Anywhere"—User Guide, AWS, Jul. 5, 2022 https://docs.aws.amazon.com/pdfs/rolesanywhere/latest/userguide/rolesanywhere-guide.pdf (Year: 2022).*

(Continued)

*Primary Examiner* — Randy A Scott

(74) *Attorney, Agent, or Firm* — Plager Schack LLP; Mark H. Plager; Stephen Hallberg

(57) ABSTRACT

An Amazon Web Services (AWS) temporary role assumption access credentials invalidation system and process for invalidating AWS temporary role assumption access credentials using session policies and session tags are disclosed. The AWS temporary role assumption access credentials invalidation system is configured to revoke the temporary credentials associated with an AWS temporary role which a user no longer needs and also ensure that a confused user does not inadvertently use an incorrect set of temporary credentials. By invalidating AWS temporary role assumption access credentials using session policies and session tags, inadvertently assumed credentials can also be immediately invalidated. Furthermore, the AWS temporary role assumption access credentials invalidation system revokes temporary credentials when a user is finished with them. This ability to immediately invalidate any issued credential provides a much more secure environment for an organization.

15 Claims, 5 Drawing Sheets

(51) Int. Cl.
    *G06F 3/06*         (2006.01)
    *G06F 21/62*      (2013.01)
    *H04L 9/32*        (2006.01)
    *H04L 67/306*    (2022.01)

(52) U.S. Cl.
    CPC .......... *G06F 3/0655* (2013.01); *G06F 3/0673*
           (2013.01); *G06F 21/62* (2013.01); *H04L*
           *9/3228* (2013.01); *H04L 67/306* (2013.01)

(56)              References Cited

U.S. PATENT DOCUMENTS

| 11,770,382 | B1 * | 9/2023 | Poghosyan | ............. H04L 63/20 |
| | | | | 726/4 |
| 2020/0092271 | A1 * | 3/2020 | Kumar | ................ G06F 9/45533 |
| 2022/0374532 | A1 * | 11/2022 | Zaharia | ................ G06F 3/0673 |

OTHER PUBLICATIONS

"Security Best Practices with AWS IAM"—Johnson et al., IAM201, AWS, Aug. 5, 2021 https://d1.awsstatic.com/events/aws-reinforce-2022/IAM201_Security-best-practices-with-AWS-IAM.pdf (Year: 2021).*

* cited by examiner

300

```
SESSION INLINE POLICY
{
    "Version" : "2024-01-17",
    "Statement" : [
      {
        "Action" : "*",
        "Effect" : "Allow",
        "Resource" : "*"
      }
    ]
}
SESSION MANAGED POLICY
arn : aws : iam : : <accountid> : policy/britive/managed/britive-<rolename>-B0
SESSION TAG
brtvid = "<uniqueid>"
```

FIG.3

INVALIDATING AWS TEMPORARY ROLE ASSUMPTION ACCESS CREDENTIALS USING SESSION POLICIES AND SESSION TAGS

CLAIM OF BENEFIT TO PRIOR APPLICATION

This application claims benefit to U.S. Provisional Patent Application 63/461,793, entitled "Invalidating AWS Temporary Role Assumption Credentials using Session Policies and Session Tags," filed Apr. 25, 2023. The U.S. Provisional Patent Application 63/461,793 is incorporated herein by reference.

BACKGROUND

Embodiments of the invention described in this specification relate generally to user/role access credentials management, and more particularly, to an AWS temporary role assumption access credentials invalidation system and a process for invalidating AWS temporary role assumption access credentials using session policies and session tags.

Amazon Web Services® (AWS®) provides a role assumption mechanism to provide users and services with temporary access to resources to accomplish various tasks. However, AWS does not provide a targeted mechanism to invalidate such temporary access upon request or after task completion. Specifically, AWS documentation states that it is not possible to perform targeted invalidation of temporary credentials upon request.

At present, there are no existing systems, methods, or mechanisms that solve this problem. In fact, all of the existing systems, methods, or mechanisms addressing this issue impact more than just the individual session being targeted. Notably, for any given Identity and Access Management (IAM) role, an administrator can set the time period of validity ("validity time") for the set of temporary credentials of the IAM role but cannot invalidate the given set of credentials before the validity time period expires without taking drastic measures that impact all users and services who may be using temporary credentials for the given IAM role. Consequently, to remove access for the user or service, the administrator would have to wait for the temporary credentials of the IAM role to naturally expire at the end of the validity time period. This is problematic for organizations because there is often a time lag until natural expiration of the credentials occurs. This presents a window in which the user or service continues to have the access even though such access is no longer needed by the user or service. In terms of security, most organizations would recognize this window as a vulnerability.

Therefore, what is needed is a way to immediately invalidate any issued access credentials, thereby providing a much more secure environment for the organization.

BRIEF DESCRIPTION

A novel AWS temporary role assumption access credentials invalidation system and process for invalidating AWS temporary role assumption access credentials using session policies and session tags are disclosed. In some embodiments, the AWS temporary role assumption access credentials invalidation system is configured to revoke the temporary credentials associated with an AWS temporary role which a user no longer needed and also ensure that a confused user does not inadvertently use an incorrect set of temporary credentials. For example, a user may inadvertently assume temporary production credentials when the user actually needs temporary development credentials. By invalidating AWS temporary role assumption access credentials using session policies and session tags, however, the inadvertently assumed credentials can be immediately invalidated. Furthermore, the AWS temporary role assumption access credentials invalidation system is configured to revoke temporary credentials when a user is finished. For instance, a user who correctly assumed the AWS temporary credentials for a development role (as intended) can utilize the temporary development credentials until no longer needed, at which point the AWS temporary role assumption access credentials invalidation system uses session policies and session tags to invalidate the credentials upon completion. This ability to immediately invalidate any issued credential provides a much more secure environment for an organization.

In some embodiments, the AWS temporary role assumption access credentials invalidation system comprises (i) an IAM managed policy configured for dynamic issuance of temporary credentials for an authenticated end user to perform a task that involves interaction with a particular service on AWS through a particular AWS account, (ii) an IAM role for which the temporary credentials are issued and which enables the authenticated end user to perform the task directly and seamlessly connected, over a session, to the particular service on AWS through the AWS account, (iii) a sessions policy and session tag file listing a managed session policy, an inline session policy, and a session tag, and (iv) a platform between the authenticated end user and AWS that is configured to authenticate the authenticated end user upon login and perform both issuance of the temporary credentials, upon request to checkout a profile by the authenticated end user, and revocation of the temporary credentials, upon a request to check-in the profile when the authenticated end user completes the task.

In some embodiments, the platform comprises a profile checkout module and a profile check-in module. In some embodiments, the platform is configured to vault the temporary credentials in a user specific vault associated with the authenticated end user. In some embodiments, vaulting the temporary credentials in the user specific vault enables the authenticated user to use the temporary credentials to complete the task at a future time. In some embodiments, the platform is configured to update the session tag of the sessions policy and session tag file with a first session tag value that uniquely identifies the session connecting the authenticated end user directly and seamlessly to AWS. In some embodiments, the platform is further configured to update the session tag of the sessions policy and session tag file with a second session tag value that is different from the first session tag value is which uniquely identifies a second session established between a second authenticated end user and AWS. In some embodiments, the temporary credentials are associated with a validity time that is set by an administrator and is unalterable. In some embodiments, the validity time corresponds to a time duration during which the temporary credentials are valid to use by the authenticated end user. In some embodiments, the temporary credentials are automatically invalidated by expiration at the end of the time duration corresponding to the validity time setting.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein:

FIG. 3 conceptually illustrates an exemplary session policies and session tag file for invalidating AWS temporary role assumption access credentials checked out and then checked in by a user in some embodiments.

DETAILED DESCRIPTION

Figure 1:
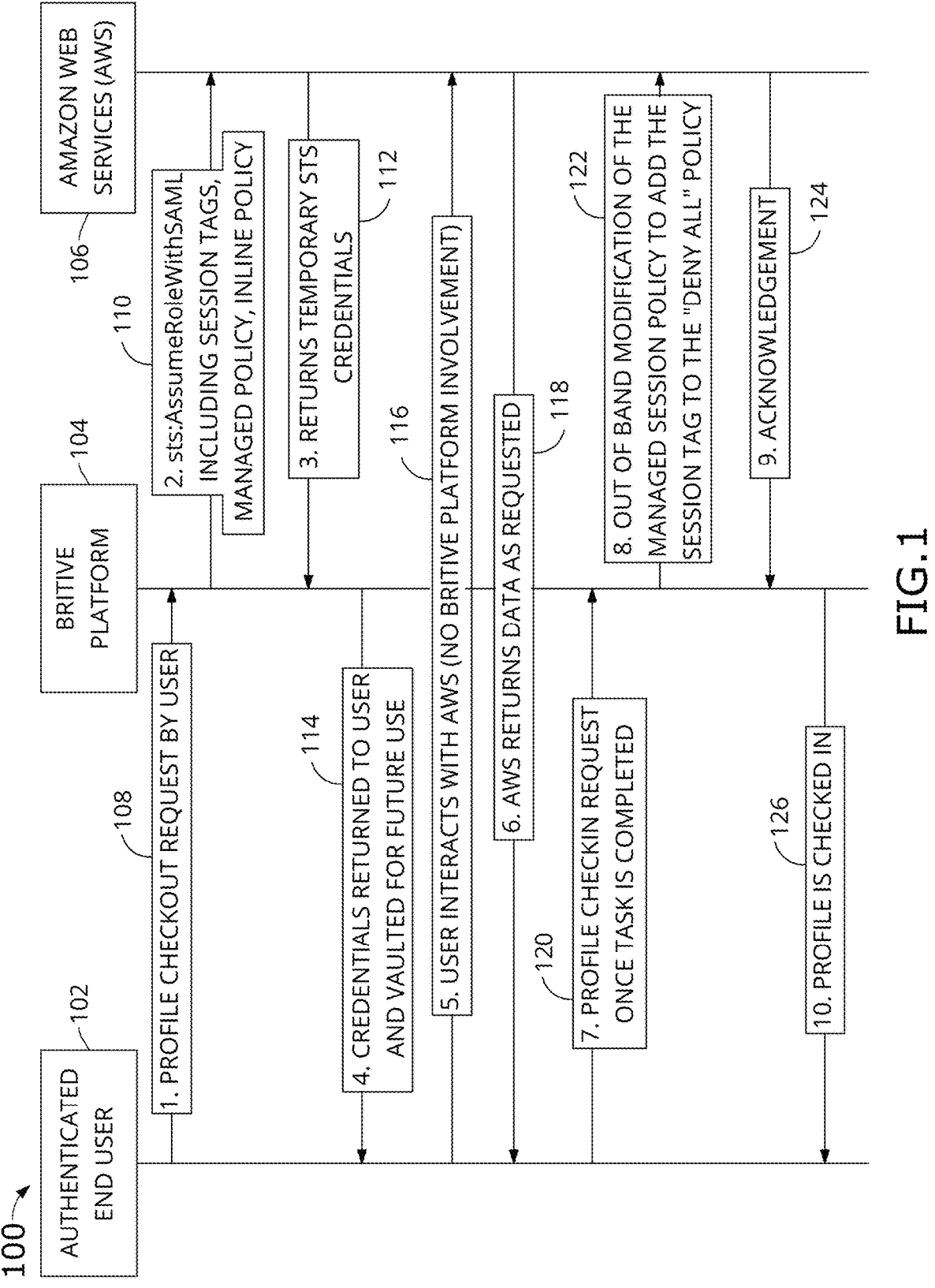
FIG. 1 conceptually illustrates an AWS temporary role assumption access credentials invalidation process for invalidating AWS temporary role assumption access credentials using session policies and session tags in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Embodiments of the invention described in this specification include an AWS temporary role assumption access credentials invalidation system and a process for invalidating AWS temporary role assumption access credentials using session policies and session tags. In some embodiments, the AWS temporary role assumption access credentials invalidation system is configured to revoke the temporary credentials associated with an AWS temporary role which a user no longer needed and also ensure that a confused user does not inadvertently use an incorrect set of temporary credentials. For example, a user may inadvertently assume temporary production credentials when the user actually needs temporary development credentials. By invalidating AWS temporary role assumption access credentials using session policies and session tags, however, the inadvertently assumed credentials can be immediately invalidated. Furthermore, the AWS temporary role assumption access credentials invalidation system is configured to revoke temporary credentials when a user is finished. For instance, a user who correctly assumed the AWS temporary credentials for a development role (as intended) can utilize the temporary development credentials until no longer needed, at which point the AWS temporary role assumption access credentials invalidation system uses session policies and session tags to invalidate the credentials upon completion. This ability to immediately invalidate any issued credential provides a much more secure environment for an organization.

In some embodiments, the AWS temporary role assumption access credentials invalidation system comprises (i) an IAM managed policy configured for dynamic issuance of temporary credentials for an authenticated end user to perform a task that involves interaction with a particular service on AWS through a particular AWS account, (ii) an IAM role for which the temporary credentials are issued and which enables the authenticated end user to perform the task directly and seamlessly connected, over a session, to the particular service on AWS through the AWS account, (iii) a sessions policy and session tag file listing a managed session policy, an inline session policy, and a session tag, and (iv) a platform between the authenticated end user and AWS that is configured to authenticate the authenticated end user upon login and perform both issuance of the temporary credentials, upon request to checkout a profile by the authenticated end user, and revocation of the temporary credentials, upon a request to check-in the profile when the authenticated end user completes the task.

In some embodiments, the platform comprises a profile checkout module and a profile check-in module. In some embodiments, the platform is configured to vault the temporary credentials in a user specific vault associated with the authenticated end user. In some embodiments, vaulting the temporary credentials in the user specific vault enables the authenticated user to use the temporary credentials to complete the task at a future time. In some embodiments, the platform is configured to update the session tag of the sessions policy and session tag file with a first session tag value that uniquely identifies the session connecting the authenticated end user directly and seamlessly to AWS. In some embodiments, the platform is further configured to update the session tag of the sessions policy and session tag file with a second session tag value that is different from the first session tag value is which uniquely identifies a second session established between a second authenticated end user and AWS. In some embodiments, the temporary credentials are associated with a validity time that is set by an administrator and is unalterable. In some embodiments, the validity time corresponds to a time duration during which the temporary credentials are valid to use by the authenticated end user. In some embodiments, the temporary credentials are automatically invalidated by expiration at the end of the time duration corresponding to the validity time setting.

As stated above, AWS provides a role assumption mechanism to provide users and services with temporary access to resources to accomplish various tasks. However, AWS does not provide a targeted mechanism to invalidate such temporary access upon request or after task completion. Specifically, AWS documentation states that it is not possible to perform targeted invalidation of temporary credentials upon request. At present, there are no existing systems, methods, or mechanisms that solve this problem. In fact, all of the existing systems, methods, or mechanisms addressing this issue impact more than just the individual session being targeted. Notably, for any given Identity and Access Management (IAM) role, an administrator can set the time period of validity ("validity time") for the set of temporary credentials of the IAM role but cannot invalidate the given set of credentials before the validity time period expires without taking drastic measures that impact all users and services who may be using temporary credentials for the given IAM role. Consequently, to remove access for the user or service, the administrator would have to wait for the temporary credentials of the IAM role to naturally expire at the end of the validity time period. This is problematic for organizations because there is often a time lag until natural expiration of the credentials occurs. This presents a window in which the user or service continues to have the access even though such access is no longer needed by the user or service. In terms of security, most organizations would recognize this window as a vulnerability. Embodiments of the AWS temporary role assumption access credentials invalidation system described in this specification solve such problems by providing a way to leverage AWS session policies (both managed and inline) and session tags to, upon request, effectively invalidate temporary role assumption access credentials for an individual user or service.

Embodiments of the AWS temporary role assumption access credentials invalidation system and process described in this specification differ from and improve upon currently existing options. In particular, AWS documentation states that it is not possible to perform targeted invalidation of temporary credentials upon request. All other existing solutions, systems, methods, mechanisms, etc., end up impacting more than just the individual session being targeted. Furthermore, waiting for a validity period to expire is an unacceptable solution when a credential has been compromised. By contrast, the AWS temporary role assumption access credentials invalidation system and process of the present disclosure provide a way to perform targeted invalidation of temporary access credentials upon request, in a way that does not impact other sessions beyond the individual session being targeted In addition, the AWS temporary role assumption access credentials invalidation system and process also help to ensure that a confused individual does not inadvertently use an incorrect set of temporary credentials by ensuring that unneeded temporary access credentials are revoked. The ability to immediately invalidate any issued access credential provides a much more secure environment for the organization.

The AWS temporary role assumption access credentials invalidation system and process of the present disclosure may be comprised of the following elements. This list of possible constituent elements is intended to be exemplary only and it is not intended that this list be used to limit the AWS temporary role assumption access credentials invalidation system and process of the present application to just these elements. Persons having ordinary skill in the art relevant to the present disclosure may understand there to be equivalent elements that may be substituted within the present disclosure without changing the essential function or operation of the AWS temporary role assumption access credentials invalidation system and process.

1. An IAM managed policy or mechanism to dynamically create IAM-managed policies under a well-defined resource path
2. An IAM role and associated trust policy (IAM managed policy) with permission to tag, assume role sessions, set source identity, and assume role
3. A managed session policy
4. An inline session policy which allows all actions and resources
5. A unique session tag per temporary session
6. A permission which needs to be temporarily assigned to a user or service 7. A mechanism to tie the vending of temporary credentials to the request to then revocation of the same credentials
8. A service/platform which orchestrates all of the above steps The various elements of the AWS temporary role assumption access credentials invalidation system and process of the present disclosure may be related in the following exemplary fashion. It is not intended to limit the scope or nature of the relationships between the various elements and the following examples are presented as illustrative examples only. When a user or service (#6) requires access to AWS, they issue a command to the platform (#8) which results in temporary credentials being vended for the IAM role being requested (#2). During the vending process, the platform (#8) dynamically creates an IAM managed policy (#1) if required and sets the policy contents to deny all actions if certain principal tag conditions are met. The platform (#8) proceeds to perform an assume role call which takes advantage of session managed policies (#3), session inline policies (#4), and session tags (#5). When the user or service has completed all required actions for the task at hand, the user or service issues a command to the platform (#8) to revoke/invalidate the temporary credentials. The platform (#8) uses internal correlation mechanisms (#7) to dynamically update the IAM managed policy (#1) to insert additional principal tag-based conditions which results in revocation of the temporary credentials.

The AWS temporary role assumption access credentials invalidation system and process of the present disclosure generally work by a software implementation in which an IAM role (#2) in an AWS account is a prerequisite for starting. The platform (#8) performs both the issuance and revocation of temporary credentials. As such, platform (#8) has visibility into both sides of the transaction. When the platform (#8) is requested to issue temporary credentials, it conditionally performs IAM managed policy (#1) creation and always creates session managed policies (#3), session inline policies (#4), and session tags (#5) as part of the call to vend temporary credentials for an IAM role (#2). Upon request to revoke temporary credentials, the platform (#8) adds the unique session tag (#5) assigned to the temporary credentials to the IAM managed policy (#1). This activates the conditional deny policy for the specific temporary credentials. And an explicit deny in AWS overrides all other IAM actions.

The managed IAM policy (#1) would be created if it does not already exist. Logic internal to the platform (#8) makes that decision at run time.

The user or service instructs the platform (#8) that the temporary credentials should be revoked, at which time the platform (#8) uses internal logic to correlate the issuance of the temporary credentials with the proper IAM managed policy (#1) which is then updated at run time to properly revoke the temporary credentials.

To make the AWS temporary role assumption access credentials invalidation system and process of the present disclosure, a person may design, develop, code, and deploy a software implementation of the process for invalidating AWS temporary role assumption access credentials using session policies and session tags. The software would be configured to perform "steps" such as those listed above. The code/instructions for the software may be executed as custom software on a processing unit of a computing device via the AWS command line interface. Since the software implementation may be configured to perform the operations of the process for invalidating AWS temporary role assumption access credentials using session policies and session tags, the development of the software may also include a user interface (UI) and managed service which execute all of the steps of the process for invalidating AWS temporary role assumption access credentials using session policies and session tags without the user's knowledge when they request and discontinue using the temporary role. An advisory network lock mechanism may be integrated into the software-implemented process for invalidating AWS temporary role assumption access credentials using session policies and session tags and/or the AWS temporary role assumption access credentials invalidation system to prevent race conditions when creating policies. Further service control policies may enhance security of the IAM managed policies. The service platform (#8) orchestrates the IAM managed policy (#1), the IAM role and associated trust policy (#2), the managed session policy (#3), the inline session policy (#4), the unique session tag (#5), the temporary permissions (#6), and the vending/revocation system. Notably, the temporary permissions (#6) occur, at which time the IAM managed policy (#1) is dynamically created, if required. In some embodiments, creation of the managed session policy (#3), the inline session policy (#4), and the unique session tag (#5) occur at the same time during the assume role call to issue temporary credentials. The internal correlation mechanisms (#7) occurs at request to revoke the credentials and the policy associated with the IAM managed policy (#1) is updated.

By utilizing the AWS temporary role assumption access credentials invalidation system of the present disclosure, an administrator is able to grant a user or a service access to a role to perform a specific action and invalidate those temporary role credentials immediately after that action has been completed. This results in enhanced security at an organization.

By way of example, FIG. 1 conceptually illustrates an AWS temporary role assumption access credentials invalidation process 100 for invalidating AWS temporary role assumption access credentials using session policies and session tags in some embodiments. As shown in this figure, different steps of the AWS temporary role assumption access credentials invalidation process 100 are performed by different users or services, namely, an authenticated end user 102, a platform 104 (hereinafter also referred to as the "Britive Platform") of the AWS temporary role assumption access credentials invalidation system, and Amazon Web Services (AWS) 106. In this case, the AWS temporary role assumption access credentials invalidation process 100 starts with the authenticated end user 102 making a profile checkout request (at 108). Notably, the authenticated end user 102 is already connected to the Britive Platform 104 and has been authenticated. Thus, when the profile checkout request (at 108) is made by the authenticated end user 102, the Britive Platform 104 receives the request and transmits an API call to AWS 106. Specifically, the API call is transmitted by the Britive Platform 104 to AWS 106 is a security token service API call ("sts:AssumeRoleWith-SAML") and includes session tags, managed policy, and inline policy (at 110). After receiving the sts:AssumeRole-WithSAML call, AWS 106 returns a set of temporary security credentials (at 112) for the authenticated end user 102, via a SAML authentication response transmitted back to the Britive Platform 104.

Then the AWS temporary role assumption access credentials invalidation process 100 proceeds to the next step, at which the Britive Platform 104 returns the temporary credentials (at 114) to the authenticated end user 102. Contemporaneously with returning the temporary credentials (at 114) to the authenticated end user 102, the Britive Platform 104 of some embodiments also vaults the temporary credentials for future use (at 114).

Now that that authenticated end user 102 is in possession of the temporary security credentials, interaction by the authenticated end user 102 and AWS 106 is direct and seamless (at 116). Specifically, the authenticated end user 102 is able to interact directly with AWS 106 with no involvement of the Britive Platform 104. Similarly, AWS 106 is able to directly and seamlessly return data to the authenticated end user 102 as requested (at 118), with no involvement of the Britive Platform 104.

The authenticated end user 102 may be interacting with AWS 106 in connection with one single task or several related tasks, but either way, the AWS temporary role assumption access credentials invalidation process 100 proceeds to a profile check-in step (at 120) after the authenticated end user 102 is completed with the task(s). Specifically, a profile check-in request is transmitted (at 120) to the Britive Platform 104 once the authenticated end user 102 has completed the task(s). This step (at 120) corresponds to the first step at which the authenticated end user 102 made the profile checkout request (at 108). While the AWS temporary role assumption access credentials invalidation process 100 focuses on only a single authenticated end user 102, in practice it is common to have multiple authenticated users with profiles checked out at the same time. Accordingly, when multiple authenticated end users have checked their respective profiles, their check-in requests relate back to their respective checkout request.

Next, the Britive Platform 104 receives the profile check-in request (at 120) from the authenticated end user 102 and then issues an out of band modification of the managed session policy to AWS 106 to add the session tag to the "Deny All" policy (at 122). AWS 106 processes this and, when completed, AWS 106 sends an acknowledgment (at 124) back to the Britive Platform 104. After receiving the acknowledgment, the Britive Platform 104 sends a notification back to the authenticated end user 102 that the profile is checked in (at 126). This is the last step of the AWS temporary role assumption access credentials invalidation process 100. However, this last step (at 126) of the AWS temporary role assumption access credentials invalidation process 100 is only a last step for this example since the authenticated end user 102 could remain connected to the Britive Platform 104 to check out another profile for some other task(s), or multiple authenticated users may still be connected and using their temporary security credentials to complete their own respective tasks, etc. In this way, the AWS temporary role assumption access credentials invalidation process 100 may remain processing profile checkout and check-in requests.

Another example, which captures the essence of the AWS temporary role assumption access credentials invalidation process 100, demonstrates the AWS temporary role assumption access credentials invalidation system, in reference to FIG. 2, which is described next.

Figure 2:
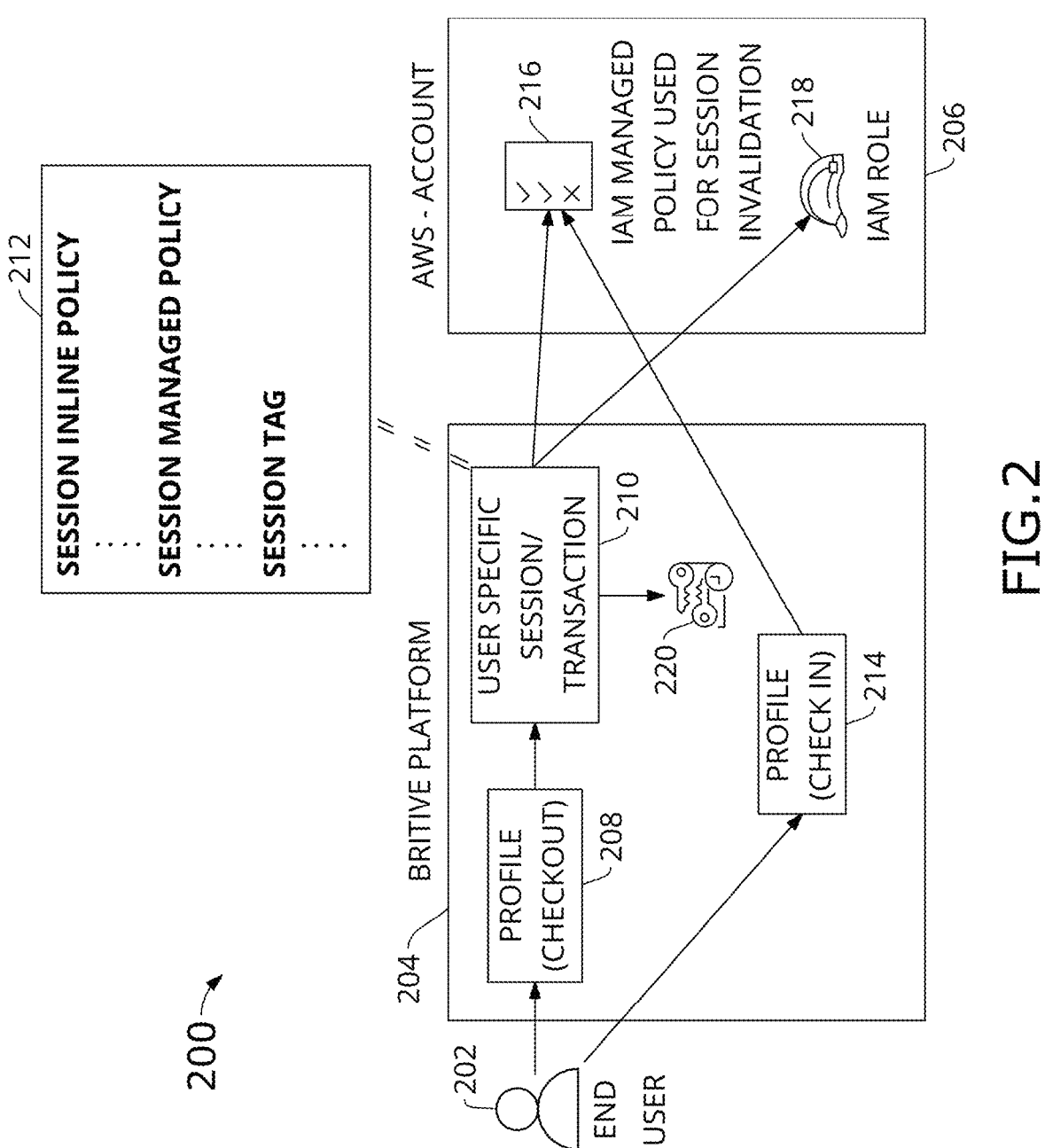
FIG. 2 conceptually illustrates a schematic view of an AWS temporary role assumption access credentials invalidation system of some embodiments with exemplary session policy and session tag code for invalidating AWS temporary role assumption access credentials checked out and then checked in by a user.

Specifically, FIG. 2 conceptually illustrates a schematic view of an AWS temporary role assumption access credentials invalidation system 200 with an exemplary session policies and session tag file for invalidating AWS temporary role assumption access credentials checked out and then checked in by a user. Specifically, the AWS temporary role assumption access credentials invalidation system 200 shown in this figure includes the different users—the authenticated end user 202, the Britive Platform 204, and AWS

206. The Britive Platform 204 itself includes a profile checkout module 208, a user-specific session/transaction 210, a session policies and session tag file 212 associated with the user specific session/transaction 210, a profile check-in module 214, and a user specific vault 220 configured to store temporary credentials for the authenticated user 202. AWS 106 include an IAM managed policy 216 used for session invalidation and an IAM role 218.

Specifically, the authenticated end user 202 logs into the Britive Platform 204 and checks out a particular profile, via profile checkout module 208. Then the profile checkout module 208 of the Britive Platform 204 creates the user-specific session/transaction 210 and makes an API call to the appropriate AWS account, as defined in the profile. The API call may be the "sts:AssumeRoleWithSAML" call, as described above by reference to FIG. 1 (at step 110). However, there are several ways to assume a role in AWS including "sts:AssumeRole" and "sts:AssumeRole With WebIdentity" calls. Each of these (and future API calls that may arise) are fully supported by the AWS temporary role assumption access credentials invalidation system and the net effect is the same-specifically, that the temporary AWS credentials are returned. Whatever the API call used to assume the role, the call includes additional attributes for session tags, session inline policies, and session managed policies, as demonstrated in the session policies and session tag file 212. Notably, the session policies and session tag file 212 need not be a separate file, but may include code within the Britive Platform 204 which is executed on a per role basis. An example of code for session policies and session tags is described below, by reference to FIG. 3.

Specifically, FIG. 3 conceptually illustrates an example of session policies and session tag code 300 (or a session policies and session tag file with such code 300) for invalidating AWS temporary role assumption access credentials checked out and then checked in by the authenticated end user. The additional tags and policies of the session policies and session tag code 300 are a core aspect of how the Britive Platform 204 offers targeted AWS session invalidation.

Now, referring back to the AWS temporary role assumption access credentials invalidation system 200 of FIG. 2, the IAM managed policy 216 is invoked via AWS 206 in order to receive the temporary credentials for the IAM role 218. If there is no existing IAM managed policy 216 for the role, the managed session policy (IAM managed policy 216) is created in real-time. When the Britive Platform 204 receives the temporary credentials issued by AWS 206, the Britive Platform 204 vaults the temporary credentials in the user specific vault 220 for the authenticated end user 202 to use at a later time. In this way, the authenticated end user 202 may interact directly and seamlessly with AWS 206 with no involvement of the Britive Platform 204. Once the authenticated end user 202 completes the task (which would be some time in the future), the authenticated end user 202 would typically notify the Britive Platform 204 that it is checking in the profile, via the profile check-in module 214. However, if the authenticated end user 202 forgets to check-in the profile, the profile would naturally expire after a set time, which may be the validity time set by an administrator (e.g., after a maximum time of twelve hours). Then, the Britive Platform 204 would, out of band, update of the IAM managed policy 216 to add the value for the 'brtvid' session tag to the policy, as shown in the session policies and session tag code 300 of FIG. 3. In this way, the AWS temporary role assumption access credentials invalidation system 200 is able to deny access to the temporary credentials that were specifically issued to the authenticated end user 202.

Figure 4:
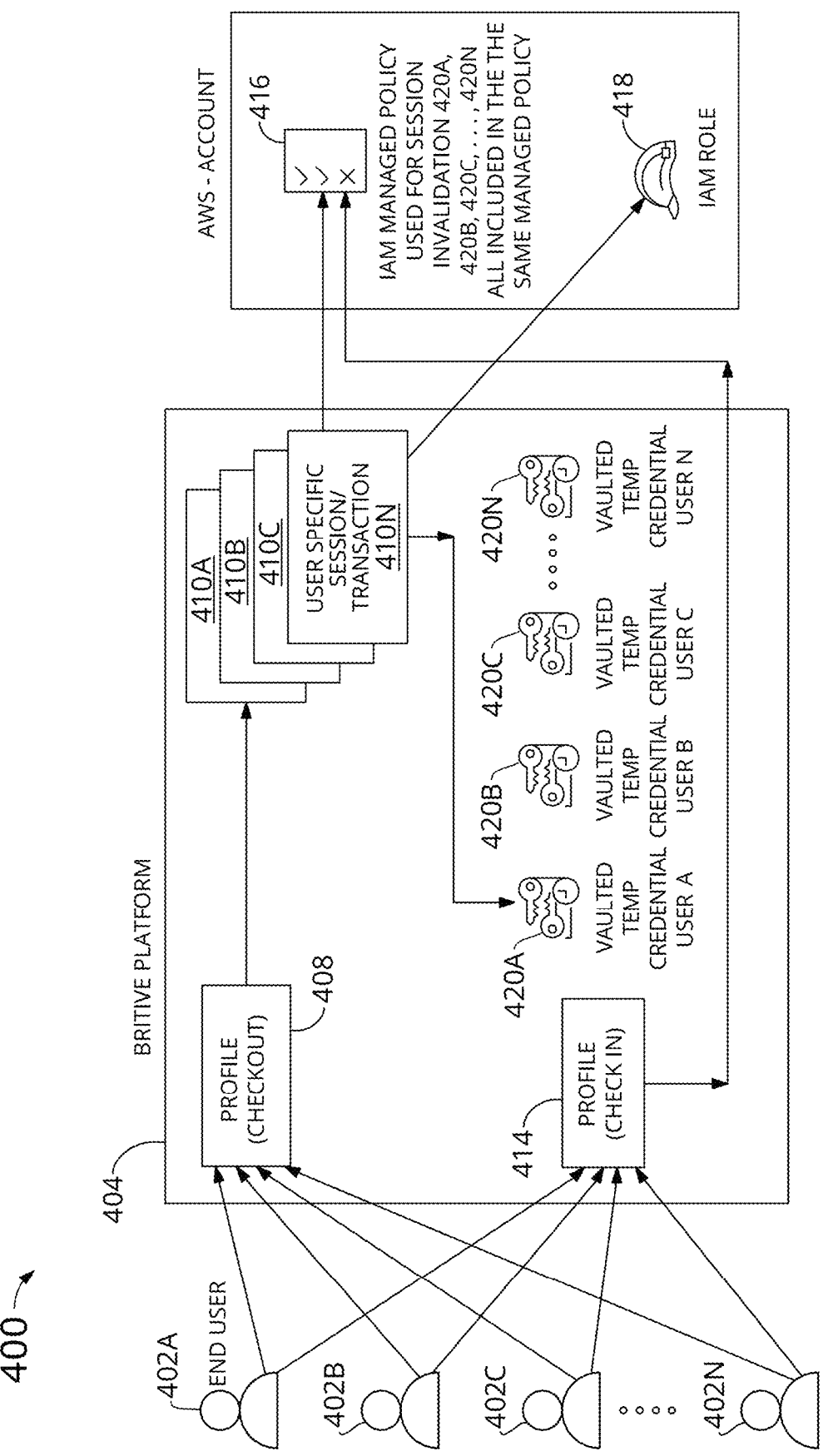
FIG. 4 conceptually illustrates a schematic view of the AWS temporary role assumption access credentials invalidation system in some embodiments with revocation of temporary role assumption access credentials checked out and then checked in by several different users.

Now, a similar scenario plays out when there are multiple authenticated users connected to the Britive Platform, which is described next, by reference to FIG. 4. Specifically, FIG. 4 conceptually illustrates a schematic view of the AWS temporary role assumption access credentials invalidation system 400 with revocation of temporary role assumption access credentials checked out and then checked in by several different users. As shown in this figure, instead of demonstrating a single authenticated end user 202, as in FIG. 2, there are multiple authenticated end users 402A, 402B, 402C, . . . , and 402N connected to the Britive Platform 404. Each of the authenticated end users makes their own request for profile checkout, via the profile checkout module 408 of the Britive Platform 404. Unlike the single user specific session/transaction 210 and the single user specific vault 220, described above by reference to FIG. 2, there are multiple user specific session/transactions 410A, 410B, 410C, . . . , and 410N, each of which corresponds to one of the authenticated end users 402A, 402B, 402C, . . . , and 402N, respectively. Similarly, the Britive Platform 404 vaults the temporary credentials issued by AWS for later use by each of the authenticated end users 402A, 402B, 402C, . . . , and 402N. Specifically, the Britive Platform 404 vaults the temporary credentials in individual user specific vaults 420A, 420B, 420C, . . . , and 420N that correspond to the authenticated end users 402A, 402B, 402C, . . . , and 402N, respectively.

In this example, all of the authenticated end users 402A, 402B, 402C, . . . , and 402N have requested checkout of the same profile, associated with the same IAM role 418 on the AWS account. Consequently, the IAM managed policy 416 which is used for session invalidation with respect to the IAM role 418, is only a single managed policy for all of the authenticated end users 402A, 402B, 402C, . . . , and 402N. When each of the authenticated end users 402A, 402B, 402C, . . . , and 402N individually requests check-in of their profile (after completion of their respective task at, typically, different times), the profile check-in module 414 is invoked. This triggers the Britive Platform 404 to update the IAM managed policy 416 to add the value for the 'brtvid' session tag to the policy, but only for the particular authenticated end user. This update ensures that access to the temporary credentials issued to the particular authenticated end user would be denied for any user.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 5:
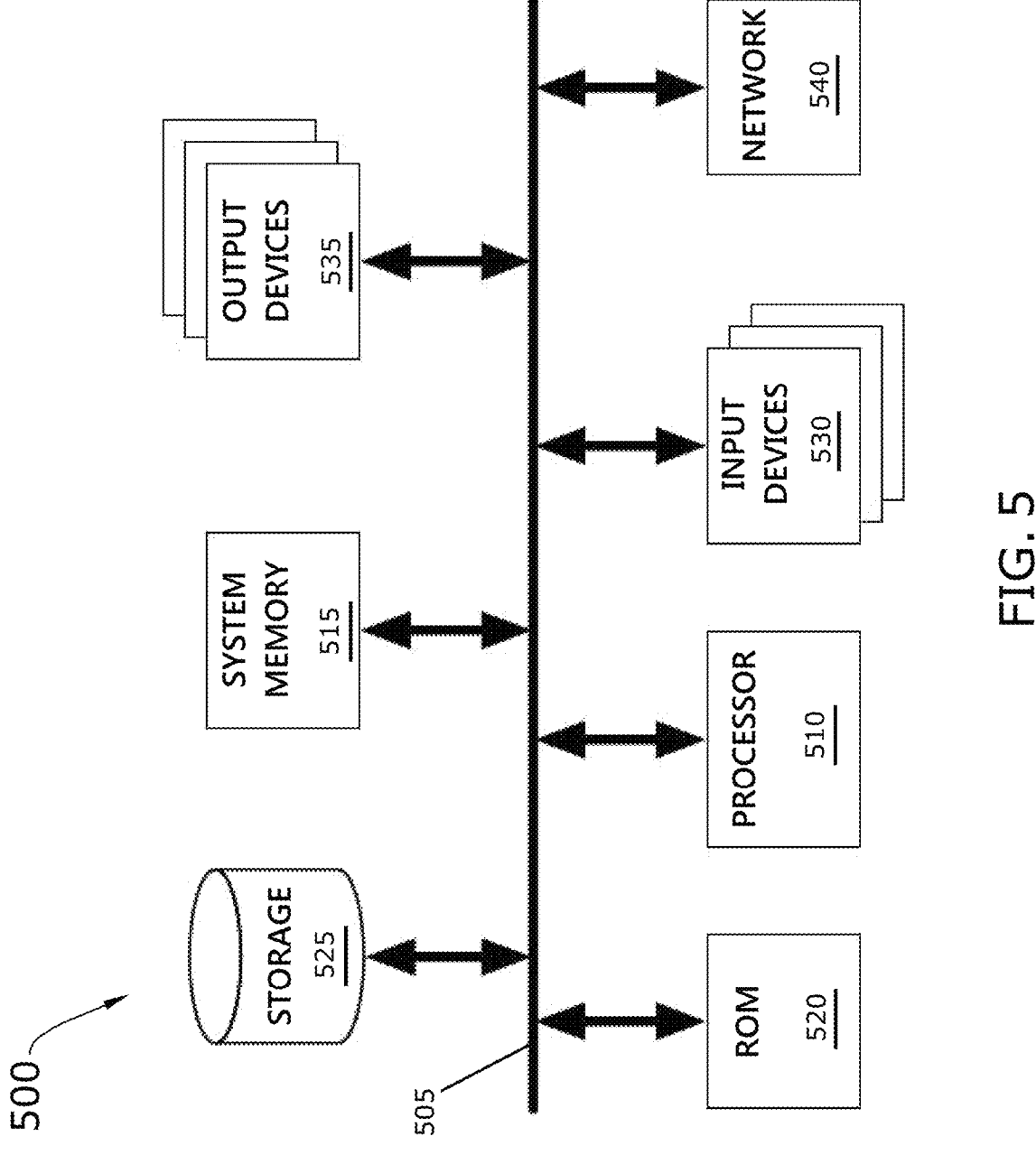
FIG. 5 conceptually illustrates an electronic system with which some embodiments of the invention are implemented.

By way of example, FIG. 5 conceptually illustrates an electronic system 500 with which some embodiments of the invention are implemented. The electronic system 500 may be a computer, a mobile device, a server, a multi-server platform, a cloud platform with one or more server(s), a single board computer (SBC), or any other sort of electronic or computing device. Such an electronic system includes various types of computer readable media and interfaces for various other types of computer readable media. Electronic system 500 includes a bus 505, processing unit(s) 510, a system memory 515, a read-only memory 520, a permanent storage device 525, input devices 530, output devices 535, and a network 540.

The bus 505 collectively represents all system, peripheral, and chipset buses that communicatively connect the numerous internal devices of the electronic system 500. For instance, the bus 505 communicatively connects the processing unit(s) 510 with the read-only memory 520, the system memory 515, and the permanent storage device 525.

From these various memory units, the processing unit(s) 510 retrieves instructions to execute and data to process in order to execute the processes of the invention. The processing unit(s) may be a single processor or a multi-core processor in different embodiments.

The read-only-memory (ROM) 520 stores static data and instructions that are needed by the processing unit(s) 510 and other modules of the electronic system. The permanent storage device 525, on the other hand, is a read-and-write memory device. This device is a non-volatile memory unit that stores instructions and data even when the electronic system 500 is off. Some embodiments of the invention use a mass-storage device (such as a magnetic or optical disk and its corresponding disk drive) as the permanent storage device 525.

Other embodiments use a removable storage device (such as a floppy disk or a flash drive) as the permanent storage device 525. Like the permanent storage device 525, the system memory 515 is a read-and-write memory device. However, unlike storage device 525, the system memory 515 is a volatile read-and-write memory, such as a random access memory. The system memory 515 stores some of the instructions and data that the processor needs at runtime. In some embodiments, the invention's processes are stored in the system memory 515, the permanent storage device 525, and/or the read-only memory 520. For example, the various memory units include instructions from session policies and session tags in accordance with some embodiments. From these various memory units, the processing unit(s) 510 retrieves instructions to execute and data to process in order to execute the processes of some embodiments.

The bus 505 also connects to the input and output devices 530 and 535. The input devices enable the user to communicate information and select commands to the electronic system. The input devices 530 include alphanumeric keyboards and pointing devices (also called "cursor control devices"). The output devices 535 display images generated by the electronic system 500. The output devices 535 include printers and display devices, such as liquid crystal displays (LCD) and organic light emitting diode (OLED) displays. Some embodiments include devices such as a touchscreen that functions as both input and output devices.

Finally, as shown in FIG. 5, bus 505 also couples electronic system 500 to a network 540 through a network adapter (not shown). In this manner, the computer can be a part of a network of computers (such as a local area network ("LAN"), a wide area network ("WAN"), or an intranet), or a network of networks (such as the Internet). Any or all components of electronic system 500 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIG. 1 conceptually illustrates a process for invalidating AWS temporary role assumption access credentials using session policies and session tags. The specific operations of the process may not be performed in the exact order shown and described. Specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A temporary role assumption access credential invalidation system operating in an Amazon Web Services (AWS) environment, the system comprising one or more processors and one or more non-transitory memories storing instructions that, when executed by the one or more processors, cause a credential management platform to:

receive an authenticated request from an authenticated end user to access a particular AWS service;

generate a role assumption request for an identity and access management (IAM) role associated with an IAM managed policy, the role assumption request including a session policy comprising a managed session policy, an inline session policy, and a session tag containing a session identifier corresponding to a session connection;

transmit the role assumption request to AWS and receive temporary security credentials issued by said AWS for the IAM role, the temporary security credentials having a defined validity time;

associate the temporary security credentials with a user profile corresponding to the authenticated end user;

store the temporary security credentials within a user-specific credential vault accessible to the authenticated end user during performance of a task involving the particular AWS service; manage the session connection using a profile checkout module configured to initiate access to the IAM role and a profile check-in module configured to terminate access associated with the user profile; and responsive to receipt of a profile check-in event processed by the profile check-in module indicating completion of the task, modify the IAM managed policy independently of expiration of the validity time by introducing a deny authorization condition referencing the session identifier such that authorization associated with the temporary security credentials is invalidated prior to expiration of the validity time.

2. The system of claim 1, wherein the credential management platform manages a session connection established using the temporary security credentials for the IAM role after issuance of the temporary security credentials.

3. The system of claim 2, wherein the session identifier uniquely identifies the session connection associated with the authenticated end user.

4. The system of claim 3, wherein an administrator defines the validity time associated with issuance of the temporary security credentials.

5. The system of claim 4, wherein the temporary security credentials remain cryptographically valid after the profile check-in event while access authorization is denied as a result of modification of the IAM managed policy.

6. The system of claim 5, wherein the profile check-in module is configured to invalidate authorization associated with the temporary security credentials responsive to a request to check in the user profile after completion of the task.

7. The system of claim 6, wherein the profile check-in module modifies the IAM managed policy to introduce the deny authorization condition referencing the session identifier.

8. The system of claim 7, wherein the profile check-in module updates the session tag associated with the session identifier as part of the modification of the IAM managed policy.

9. The system of claim 8, wherein the credential management platform is configured to conditionally create the managed session policy and the inline session policy contemporaneously with issuing the temporary security credentials for the IAM role.

10. The system of claim 7, wherein the modification of the IAM managed policy ensures that access to the temporary security credentials is denied to an authenticated end user after the IAM managed policy is modified.

11. The system of claim 1, wherein a second session tag containing a second session identifier different from the session identifier uniquely identifies a second session connection of a second authenticated end user to AWS after AWS issues temporary security credentials for the IAM role to the second authenticated end user for completion of a second task.

12. The system of claim 1, wherein the IAM managed policy is dynamically created upon a first request to check-out a particular profile associated with the IAM role.

13. The system of claim 1, wherein the credential management platform is configured to vault the temporary security credentials in a user specific vault associated with the authenticated end user.

14. The system of claim 13, wherein vaulting the temporary credentials in the user specific vault enables the authenticated user to use the temporary credentials to complete the task at a future time.

15. The system of claim 1, wherein the particular AWS service is associated with a particular AWS account and the authenticated end user has permissions to access the particular AWS service via the particular AWS account.

* * * * *